United States Patent
Wang et al.

(10) Patent No.: US 12,126,523 B2
(45) Date of Patent: Oct. 22, 2024

(54) METHOD FOR MULTIPLEXING HTTP CHANNELS AND TERMINAL

(71) Applicants: Huawei Technologies Co., Ltd., Shenzhen (CN); Peking University, Beijing (CN)

(72) Inventors: Hao Wang, Shanghai (CN); Zheng Hu, Shenzhen (CN); Chenren Xu, Beijing (CN); Shuo Chen, Shenzhen (CN); Xingmin Guo, Shanghai (CN); Xiaojin Li, Shenzhen (CN)

(73) Assignees: Huawei Technologies Co., Ltd., Shenzhen (CN); Peking University, Beijing (CN)

( * ) Notice: Subject to any disclaimer, the term of this patent is extended or adjusted under 35 U.S.C. 154(b) by 312 days.

(21) Appl. No.: 17/839,154

(22) Filed: Jun. 13, 2022

(65) Prior Publication Data

US 2022/0311700 A1    Sep. 29, 2022

Related U.S. Application Data

(63) Continuation of application No. PCT/CN2020/125442, filed on Oct. 30, 2020.

(30) Foreign Application Priority Data

Dec. 12, 2019 (CN) .......................... 201911275947.2

(51) Int. Cl.
*H04L 67/02* (2022.01)
*H04L 45/24* (2022.01)
(Continued)

(52) U.S. Cl.
CPC .............. *H04L 45/24* (2013.01); *H04L 47/36* (2013.01); *H04L 67/02* (2013.01); *H04W 72/04* (2013.01)

(58) Field of Classification Search
CPC ......... H04L 45/24; H04L 47/36; H04L 67/02; H04L 47/28; H04L 61/4511; H04L 67/55;
(Continued)

(56) References Cited

U.S. PATENT DOCUMENTS

2016/0219311 A1    7/2016 Yamagishi
2016/0337426 A1*  11/2016 Shribman ............. H04L 65/612
(Continued)

FOREIGN PATENT DOCUMENTS

CN    102090061 A    6/2011
CN    102710748 A    10/2012
(Continued)

OTHER PUBLICATIONS

Cai Yanan, "Research and Implementation of HTTP Optimization Method," Beijing University of Posts and Telecommunications, Computer Technology, Master's Dissertation, Total 79 pages (2016). With an English Abstract.

(Continued)

*Primary Examiner* — Cheikh T Ndiaye
(74) *Attorney, Agent, or Firm* — Leydig, Voit & Mayer, Ltd.

(57) ABSTRACT

This application provides a method for multiplexing HTTP channels. The method includes: sending, by the terminal, a first HTTP request to a first server through a first HTTP channel, to request first data; after receiving a first HTTP response returned by the first server, receiving, through the first HTTP channel, a first part that is of the first data and that is sent by the first server; and if a size that is of the first data and that is carried in the first HTTP response is greater than a first threshold, generating a second HTTP request, and sending a second HTTP request to a second server through a second HTTP channel, to request a second part of the first data; and after receiving the first part of the first data, (Continued)

sending control signaling to the first server, to disconnect the first HTTP channel.

20 Claims, 8 Drawing Sheets

(51) Int. Cl.
   *H04L 47/36* (2022.01)
   *H04W 72/04* (2023.01)

(58) Field of Classification Search
   CPC .............. H04W 72/04; H04N 21/2402; H04N 21/4622; H04N 21/8456
   See application file for complete search history.

(56) References Cited

U.S. PATENT DOCUMENTS

| | | | |
|---|---|---|---|
| 2017/0302570 | A1 | 10/2017 | Liu |
| 2018/0167436 | A1* | 6/2018 | Han ................ H04L 47/41 |
| 2018/0262419 | A1* | 9/2018 | Ludin ............... H04L 45/24 |

FOREIGN PATENT DOCUMENTS

| | | |
|---|---|---|
| CN | 103200606 A | 7/2013 |
| CN | 103875304 A | 6/2014 |
| CN | 104113564 A | 10/2014 |
| CN | 104205771 A | 12/2014 |
| CN | 104580389 A | 4/2015 |
| CN | 106134147 A | 11/2016 |
| CN | 107949069 A | 4/2018 |
| CN | 108174410 A | 6/2018 |
| CN | 109076017 A | 12/2018 |
| CN | 110213320 A | 9/2019 |
| CN | 111131019 A | 5/2020 |
| WO | 2005060334 A3 | 7/2005 |

OTHER PUBLICATIONS

Nikravesh et al., "MP-H2: A Client-only Multipath Solution for HTTP/2," MobiCom '19, Los Cabos, Mexico, Total 16 pages (Oct. 21-25, 2019).

"Series H: Audiovisual and Multimedia Systems, Infrastructure of audiovisual services—Coding of moving video," Advanced video coding for generic audiovisual services, ITU-T H.264, Total 836 pages, International Union of Telecommunication, Geneva, Switzerland (Jun. 2019).

Han et al., "MP-DASH: Adaptive Video Streaming Over Preference-Aware Multipath," CoNEXT '16, Irvine, CA, USA, Total 15 pages (Dec. 12-15, 2016).

Bagnulo, "Threat Analysis for TCP Extensions for Multipath Operation with Multiple Addresses," Internet Engineering Task Force (IETF), Request for Comments: 6181, Total 17 pages, Internet Engineering Task Force, Reston, Virginia (Mar. 2011).

Ford et al., "Architectural Guidelines for Multipath TCP Development," Internet Engineering Task Force (IETF), Request for Comments: 6182, Total 28 pages, Internet Engineering Task Force, Reston, Virginia (Mar. 2011).

Raiciu et al., "Coupled Congestion Control for Multipath Transport Protocols," Internet Engineering Task Force (IETF), Request for Comments: 6356, Total 12 pages, Internet Engineering Task Force, Reston, Virginia (Oct. 2011).

Ford et al., "TCP Extensions for Multipath Operation with Multiple Addresses," Internet Engineering Task Force (IETF), Request for Comments: 6824, Total 64 pages, Internet Engineering Task Force, Reston, Virginia (Jan. 2013).

Scharf et al., "Multipath TCP (MPTCP) Application Interface Considerations," Internet Engineering Task Force (IETF), Request for Comments: 6897, Total 31 pages, Internet Engineering Task Force, Reston, Virginia (Mar. 2013).

Bagnulo et al., "Analysis of Residual Threats and Possible Fixes for Multipath TCP (MPTCP)," Internet Engineering Task Force (IETF), Request for Comments: 7430, Total 19 pages, Internet Engineering Task Force, Reston, Virginia (Jul. 2015).

Bonaventure et al., "Use Cases and Operational Experience with Multipath TCP," Internet Engineering Task Force (IETF), Request for Comments: 8041, Total 30 pages, Internet Engineering Task Force, Reston, Virginia (Jan. 2017).

\* cited by examiner

METHOD FOR MULTIPLEXING HTTP CHANNELS AND TERMINAL

CROSS-REFERENCE TO RELATED APPLICATIONS

This application is a continuation of International Application No. PCT/CN2020/125442, filed on Oct. 30, 2020, which claims priority to Chinese Patent Application No. 201911275947.2, filed on Dec. 12, 2019. The disclosures of the aforementioned applications are hereby incorporated by reference in their entireties.

TECHNICAL FIELD

Embodiments of this application relate to the communications field, and in particular, to a method for multiplexing Hypertext Transfer Protocol (HTTP) channels and a terminal.

BACKGROUND

A multipath hypertext transfer protocol (MPHTTP) technology can implement simultaneous data transmission between a terminal and a server through a plurality of HTTP channels, to improve data transmission efficiency between the terminal and the server. For example, when a user uses a terminal to watch high-definition videos, VR resources, and the like, the terminal can transmit data requested by the user by using a Wi-Fi network and a cellular network simultaneously, to provide a larger transmission bandwidth, so that a download rate of the high-definition videos, the VR resources, and the like is faster, less frame freezing occurs, and video playing is smoother when the user watches the high-definition videos, the VR resources, and the like.

In the conventional technology, a terminal receives an instruction that a user operates an application, and generates an original HTTP request according to the operation instruction of the user. Then, the terminal splits the original HTTP request into a plurality of HTTP requests based on a range byte field carried in the original HTTP request, and separately sends the plurality of HTTP requests through different HTTP channels. The plurality of HTTP requests each are used to request, through a different HTTP channel, data of a different byte range requested in the original HTTP request, that is, simultaneous data transmission through a plurality of HTTP channels is implemented, to improve data transmission efficiency.

However, in many actual scenarios, the original HTTP request generated by the terminal does not carry a range byte field, and therefore, multiplexing of HTTP channels cannot be implemented.

SUMMARY

This application provides a method for multiplexing HTTP channels and a terminal, so that multiplexing of HTTP channels between a terminal and a server can be implemented, to improve data transmission efficiency between the terminal and the server.

To achieve the foregoing objective, embodiments of this application provide the following technical solutions.

According to a first aspect, a method for multiplexing HTTP channels is provided, and includes: A mobile terminal sends a first HTTP request to a first server through a first HTTP channel, to request first data: the mobile terminal receives, through the first HTTP channel, a first HTTP response returned by the first server, where the first HTTP response carries a size of the first data: after receiving the first HTTP response, the mobile terminal receives, through the first HTTP channel, a first part that is of the first data and that is sent by the first server: after receiving the first HTTP response, if the size of the first data is greater than a first threshold, the mobile terminal generates a second HTTP request based on the first HTTP request and the size of the first data, and sends the second HTTP request to a second server through a second HTTP channel, to request a second part of the first data: the mobile terminal receives, through the second HTTP channel, the second part that is of the first data and that is returned by the second server; and after receiving the first part of the first data, the mobile terminal sends control signaling to the first server through the first HTTP channel, to disconnect the first HTTP channel.

For example, after receiving the first HTTP response, the mobile terminal receives the first part of the first data through the first HTTP channel, and determines, based on the size that is of the first data and that is carried in the first HTTP response, whether the second HTTP request needs to be sent to the second HTTP channel, to request the second part of the first data.

That the mobile terminal generates a second HTTP request based on the first HTTP request and the size of the first data includes: The mobile terminal generates the second HTTP request based on the size of the first data and some parameters in the first HTTP request. For example, the mobile terminal sets a uniform resource identifier (Uniform Resource Identifier, URI) in the second HTTP request based on a URI in the first HTTP request, and sets a host field in the second HTTP request to an address of the second server. The mobile terminal writes a determined byte range of the second part of the first data into a range bytes field in the second HTTP request.

It can be learned that, when the mobile terminal receives the first part of the first data from the first server through the first HTTP channel, the mobile terminal may also send the second HTTP request through the second HTTP channel to request the second part of the first data, so as to receive the first data through a plurality of HTTP channels. This increases a bandwidth for transmitting the first data and increases a transmission rate for transmitting the first data. For example, when the first data is video data, less frame freezing occurs, and video playing is smoother when a user watches videos.

In a possible implementation, a content length content length field in the first HTTP response carries the size of the first data.

In a possible implementation, the method further includes: The mobile terminal determines the first threshold based on the size of the first data, a bandwidth of the first HTTP channel, a bandwidth of the second HTTP channel, and round-trip time of the second HTTP channel: or the mobile terminal determines the first threshold based on the size of the first data, a bandwidth of the first HTTP channel, and round-trip time of the second HTTP channel.

In a possible implementation, the method further includes: The mobile terminal determines the byte range of the second part of the first data based on the size of the first data, the bandwidth of the first HTTP channel, the bandwidth of the second HTTP channel, and the round-trip time of the second HTTP channel.

In a possible implementation, the byte range of the second part of the first data starts from a middle byte of the first data to a last byte of the first data.

In a possible implementation, the method further includes: The mobile terminal uses the range byte range byte field of the second HTTP request to carry the byte range of the second part of the first data.

In a possible implementation, that the mobile terminal sends control signaling to the first server through the first HTTP channel, to disconnect the first HTTP channel is specifically: The mobile terminal sends an HTTP reset packet or a TCP reset packet to the first server through the first HTTP channel.

In a possible implementation, before the mobile terminal sends the first HTTP request to the first server through the first HTTP channel, the method further includes: The mobile terminal determines that estimated flow completion time FCT of the first HTTP channel is smallest.

The estimated FCT may include time consumed for establishing a connection on the first HTTP channel, time consumed for transmitting unit-size data on the first HTTP channel, a data transmission delay, and the like. It can be learned that the estimated FCT may reflect a data transmission rate and data transmission efficiency of an HTTP channel In a possible implementation, the method further includes: Before sending the first HTTP request to the first server through the first HTTP channel, the mobile terminal sends a first domain name system DNS request based on the first HTTP request through the first HTTP channel, to request an address of the first server, and sends a second domain name system DNS request through the second HTTP channel, to request the address of the second server.

In a possible implementation, the method further includes: Before sending the first HTTP request to the first server through the first HTTP channel, the mobile terminal establishes the first HTTP channel by using a Wi-Fi network, and establishes the second HTTP channel by using a cellular network: or before sending the first HTTP request to the first server through the first HTTP channel, the mobile terminal establishes the first HTTP channel by using a Wi-Fi network, and before sending the second HTTP request to the second server through the second HTTP channel, the mobile terminal establishes the second HTTP channel by using a cellular network.

In a possible implementation, the method further includes: After sending the TCP reset packet to the first server through the first HTTP channel, to disconnect the first HTTP channel, the mobile terminal re-establishes the first HTTP channel.

According to a second aspect, a method for multiplexing HTTP channels is provided, and includes: A mobile terminal sends a first HTTP request to a first server through a first HTTP channel, to request first data: the mobile terminal receives, through the first HTTP channel, a first HTTP response returned by the first server, where the first HTTP response carries a size of the first data: after receiving the first HTTP response, the mobile terminal receives, through the first HTTP channel, a first part that is of the first data and that is sent by the first server; after receiving the first HTTP response, the mobile terminal generates a second HTTP request based on the first HTTP request, the size of the first data, and a first proportion, and sends the second HTTP request to a second server through a second HTTP channel, to request a second part of the first data, where a data size of the second part of the first data is a product of the first proportion and the size of the first data: the mobile terminal receives, through the second HTTP channel, the second part that is of the first data and that is returned by the second server; and after receiving the first part of the first data, the mobile terminal sends first control signaling to the first server through the first HTTP channel, to disconnect the first HTTP channel.

For example, after receiving the first HTTP response, the mobile terminal receives the first part of the first data through the first HTTP channel, and determines, based on the size that is of the first data and that is carried in the first HTTP response, whether the second HTTP request needs to be sent to the second HTTP channel, to request the second part of the first data.

That the mobile terminal generates a second HTTP request based on the first HTTP request and the size of the first data includes: The mobile terminal generates the second HTTP request based on the size of the first data and some parameters in the first HTTP request. For example, the mobile terminal sets a URI in the second HTTP request based on a URI in the first HTTP request, and sets a host field in the second HTTP request to an address of the second server. The mobile terminal writes a determined byte range of the second part of the first data into a range bytes field in the second HTTP request.

In a possible implementation, the method further includes: The mobile terminal re-establishes the first HTTP channel: the mobile terminal sends a third HTTP request to the first server through the first HTTP channel, to request second data: the mobile terminal receives, through the first HTTP channel, a second HTTP response returned by the first server, where the second HTTP response carries a size of the second data: after receiving the second HTTP response, the mobile terminal receives, through the first HTTP channel, a first part that is of the second data and that is sent by the first server: after receiving the second HTTP response, the mobile terminal adjusts a value of the first proportion based on first time consumed for receiving the first part of the first data through the first HTTP channel and second time consumed for receiving the second part of the first data through the second HTTP channel: the mobile terminal generates a fourth HTTP request based on the third HTTP request, the size of the second data, and an adjusted first proportion, and sends the fourth HTTP request to the second server through the second HTTP channel, to request a second part of the second data, where a data size of the second part of the second data is a product of the adjusted first proportion and the size of the second data: the mobile terminal receives, through the second HTTP channel, the second part that is of the second data and that is returned by the second server; and after receiving the first part of the second data, the mobile terminal sends second control signaling to the first server through the first HTTP channel, to disconnect the first HTTP channel.

In a possible implementation, that the mobile terminal adjusts a value of the first proportion based on first time consumed for receiving the first part of the first data through the first HTTP channel and second time consumed for receiving the second part of the first data through the second HTTP channel is specifically: if a difference obtained by subtracting the second time from the first time is greater than a second threshold, increasing the first proportion; or if a difference obtained by subtracting the second time from the first time is less than a second threshold, decreasing the first proportion: or if a difference obtained by subtracting the second time from the first time is equal to a second threshold, maintaining the first proportion.

According to a third aspect, a mobile terminal is provided, and includes a processor, a memory, and a touchscreen, where the memory and the touchscreen are coupled to the processor. The memory is configured to store computer program code, and the computer program code includes computer instructions. When the processor reads the computer instructions from the memory, the mobile terminal is enabled to perform the method for multiplexing HTTP channels according to any one of the foregoing aspects and the possible implementations of the foregoing aspects.

According to a fourth aspect, a chip system is provided, and includes a processor. When the processor executes instructions, the processor performs the method according to any one of the foregoing aspects and the possible implementations of the foregoing aspects.

According to a fifth aspect, an apparatus is provided. A mobile terminal includes the apparatus, and the apparatus has a function of implementing behavior of the mobile terminal in the method according to any one of the foregoing aspects and the possible implementations of the foregoing aspects. The function may be implemented by hardware, or may be implemented by hardware executing corresponding software. The hardware or the software includes at least one module or unit corresponding to the function, for example, a detection module or unit, a display module or unit, a determining module or unit, and a generation module or unit.

According to a sixth aspect, a computer storage medium is provided, and includes computer instructions. When the computer instructions are run on a terminal, the terminal is enabled to perform the method according to any one of the foregoing aspects and the possible implementations of the foregoing aspects.

According to a seventh aspect, a computer program product is provided. When the computer program product is run on a computer, the computer is enabled to perform the method according to any one of the foregoing aspects and the possible implementations of the foregoing aspects.

DESCRIPTION OF EMBODIMENTS

In embodiments of this application, the words such as "example" or "for example" are used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a related concept in a specific manner.

Figure 1:
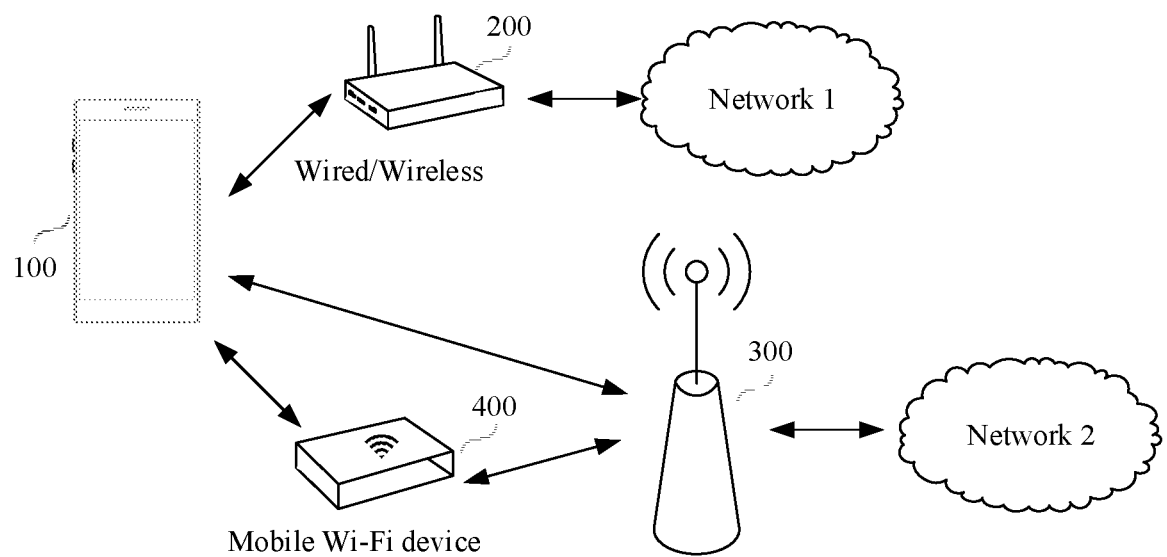
FIG. 1 is a schematic structural diagram of a communications system according to an embodiment of this application.

The following terms "first" and "second" are merely intended for a purpose of descriptions, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more FIG. 1 is a schematic structural diagram of a communications system according to an embodiment of this application. The communications system includes a mobile terminal 100 and an electronic device 200.

Various applications, for example, a video application (for example, a video playing application or a live broadcast application), a browser, a VR/AR related application, and a picture application, may be installed and run on the mobile terminal 100.

In some examples, the mobile terminal 100 may establish a connection to the electronic device 200 (for example, a router) in a wired or wireless manner (for example, Wi-Fi), access a network 1 (for example, the internet) through the electronic device 200, and interact with servers corresponding to the applications in the network 1. In other examples, the mobile terminal 100 may access a network 2 (for example, a mobile communications network) through a base station 300, and interact with servers corresponding to the applications in the network 2. Alternatively, the mobile terminal 100 accesses a network 1 through a network 2, and interacts with servers corresponding to the applications in the network 1. In still some examples, the mobile terminal 100 may also establish a connection to an electronic device 400 (for example, a mobile Wi-Fi device, or referred to as a mobile Wi-Fi device) in a wireless manner, access a network 2 through the electronic device 400 and a base station 300, and interact with servers corresponding to the applications in the network 2. Alternatively, the mobile terminal 100 accesses a network 1 through a network 2, and interacts with servers corresponding to the applications in the network 1.

It may be understood that multiplexing of HTTP channels can be implemented in the embodiments of this application. Therefore, the mobile terminal 100 has a capability of establishing at least two HTTP channels. For example, the mobile terminal 100 has a Wi-Fi communications capability and a cellular network communications capability. For example, the mobile terminal 100 may establish at least two HTTP channels. One HTTP channel is connected to the network 1 through the electronic device 200, and the other HTTP channel is connected to the network 2 through the base station 300. In some examples, the Wi-Fi communications capability of the mobile terminal 100 may support establishment of two HTTP channels. For example, the two HTTP channels are connected to a channel of the network 1 through the electronic device 200. For another example, one HTTP channel is connected to the network 1 through the electronic device 200, and another two HTTP channels are connected to the network 2 through the base station 300. A quantity of HTTP channels established by the mobile terminal 100 and a manner used for each channel are not specifically limited in this application.

When a user operates a corresponding application on the mobile terminal 100, the mobile terminal generates a corresponding first HTTP request, and sends the first HTTP request to a corresponding server through one HTTP channel (which is denoted as a first HTTP channel) of the HTTP channels. After receiving the HTTP request, the server returns a corresponding first HTTP response (response) to the mobile terminal through the first HTTP channel, and returns data (denoted as first data) requested by the mobile terminal 100.

In the embodiments of this application, after sending the first HTTP response through the first HTTP channel, the server starts to send the first data to the mobile terminal 100. In the method for multiplexing HTTP channels provided in the embodiments of this application, another HTTP channel is used to jointly transmit the first data. Therefore, the data transmitted by the server through the first HTTP channel is denoted as a first part of the first data herein.

To implement multiplexing of HTTP channels, after receiving the first HTTP response, the mobile terminal 100 further needs to generate at least one second HTTP request based on a size (for example, a content length (content-length) field in the first HTTP response) of the first data included in the first HTTP response. The at least one second HTTP request is used to request a part of data (which may be denoted as a fixed second part of the first data) in the first data. Then, the mobile terminal 100 transmits the at least one second HTTP request to the server through a channel (denoted as a second HTTP channel) other than the first HTTP channel, and the server returns the second part of the first data through the second HTTP channel. In other words, the first HTTP channel and the second HTTP channel jointly transmit the first data requested by the mobile terminal this time. This increases a transmission bandwidth of the first data, and improves data transmission efficiency.

For example, the mobile terminal 100 in this application may be a mobile phone, a tablet computer, a personal computer (personal computer, PC), a personal digital assistant (personal digital assistant, PDA), a smart watch, a netbook, a wearable electronic device, an augmented reality (augmented reality, AR) device, a virtual reality (virtual reality, VR) device, a vehicle-mounted device, a smart car, a smart stereo, a robot, and the like. A specific form of the mobile terminal is not specifically limited in this application.

Figure 2:
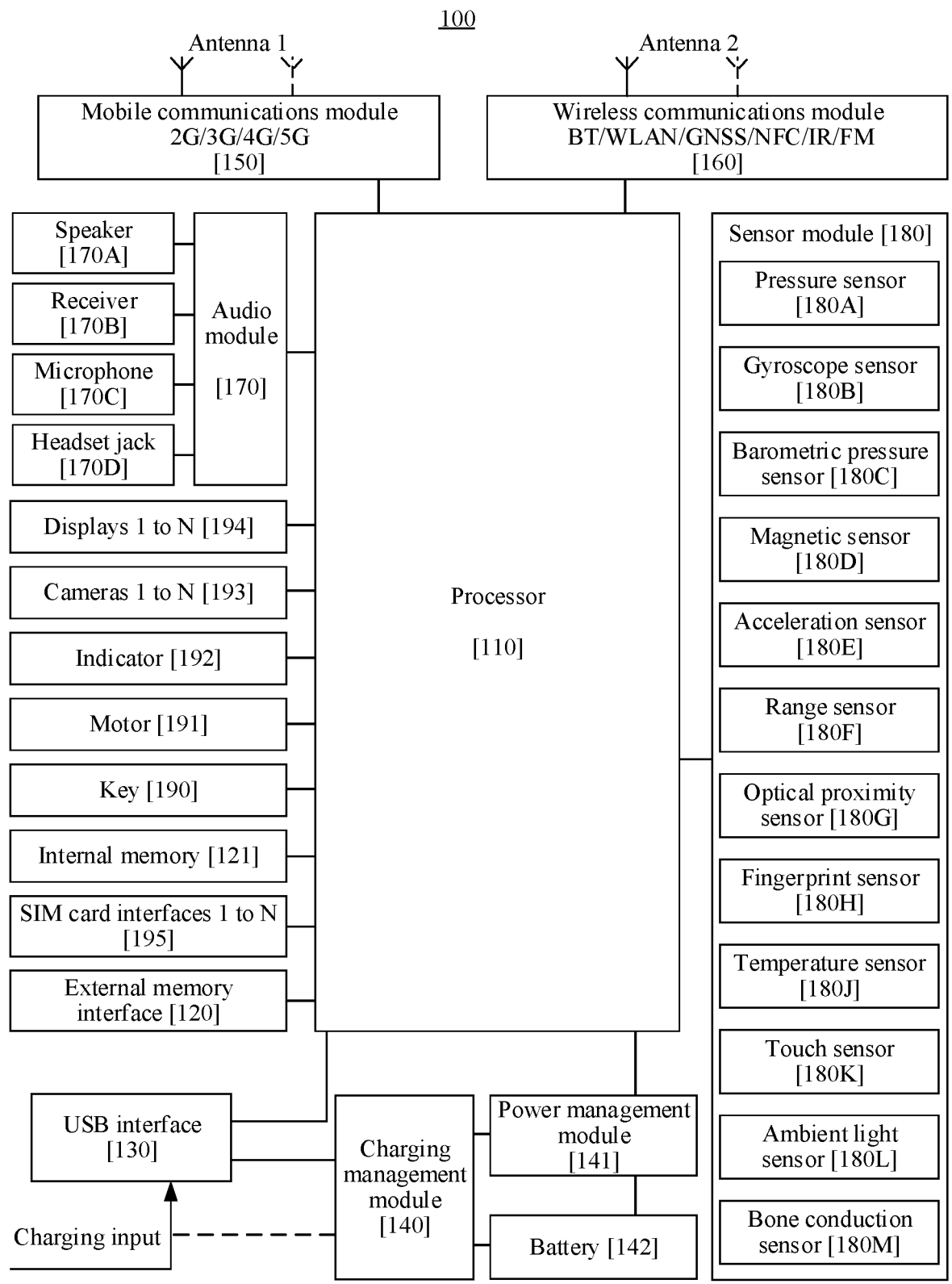
FIG. 2 is a schematic structural diagram 1 of a mobile terminal according to an embodiment of this application.

FIG. 2 is a schematic structural diagram of a mobile terminal 100.

The mobile terminal 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

It may be understood that an example structure in the embodiments of the present invention does not constitute a specific limitation on the mobile terminal 100. In some other embodiments of this application, the mobile terminal 100 may include more or fewer components than those shown in the figure, or some components may be combined, or some components may be split, or different component arrangements may be used. The components in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170). In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (display serial interface, DSI), and the like. In some embodiments, the processor 110 communicates with the camera 193 through the CSI interface, to implement a photographing function of the mobile terminal 100. The processor 110 communicates with the display 194 through the DSI interface, to implement a display function of the mobile terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the mobile terminal 100, or may be configured to transmit data between the mobile terminal 100 and a peripheral device, or may be configured to connect to a headset to play audio by using the headset. The interface may alternatively be configured to connect to another mobile terminal such as an AR device.

It may be understood that an interface connection relationship between the modules illustrated in the embodiments of the present invention is merely an example for description, and does not constitute a limitation on a structure of the mobile terminal 100. In some other embodiments of this application, the mobile terminal 100 may alternatively use an interface connection mode different from that in the foregoing embodiments, or use a combination of a plurality of interface connection modes.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the mobile terminal 100. The charging management module 140 may further supply power to the mobile terminal by using the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management unit 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the mobile terminal 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile terminal 100 may be configured to cover one or more communications frequency bands. Different antennas may be multiplexed, to increase antenna utilization. For example, the antenna 1 may be multiplexed as a diversity antenna in a wireless local area network. In other embodiments, the antenna may be used in combination with a tuning switch.

The mobile communications module 150 can provide a solution for wireless communication including 2G/3G/4G/5G and the like applied to the mobile terminal 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert, through the antenna 1, an amplified signal into an electromagnetic wave for radiation. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a solution for wireless communication such as a wireless local area network (WLAN) (for example, a wireless fidelity (Wi-Fi) network), Bluetooth (BT), a global navigation satellite system (GNSS), frequency modulation (FM), near field communication (NFC), or an infrared (IR) technology applied to the mobile terminal 100. The wireless communications module 160 may be one or more components integrated into at least one communications processor module. The wireless communications module 160 receives an electromagnetic wave through the antenna 2, performs processing such as filtering or amplification on an electromagnetic wave signal, and sends a processed signal to the processor 110. The wireless communications module 160 may further receive a to-be-sent signal from the processor 110, perform frequency modulation and amplification on the signal, and convert, through the antenna 2, a processed signal into an electromagnetic wave for radiation.

In some embodiments, the antenna 1 and the mobile communications module 150) of the mobile terminal 100 are coupled, and the antenna 2 and the wireless communications module 160 of the mobile terminal 100 are coupled, so that the mobile terminal 100 can communicate with a network and another device by using a wireless communications technology: The wireless communications technology may include a global system for mobile communications (GSM), a general packet radio service (GPRS), code division multiple access (CDMA), wideband code division multiple access (WCDMA), time division-synchronous code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or satellite based augmentation systems (SBAS).

The mobile terminal 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the mobile terminal 100 may include one or N displays 194, where N is a positive integer greater than 1.

The mobile terminal 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile terminal 100 may include one or N cameras 193, where N is a positive integer greater than 1.

The digital signal processor is configured to process a digital signal, and may process another digital signal in addition to the digital image signal. For example, when the mobile terminal 100 selects a frequency, the digital signal processor is configured to perform Fourier transform and the like on frequency energy.

The video codec is configured to compress or decompress a digital video. The mobile terminal 100 may support one or more types of video codecs. In this way, the mobile terminal 100 can play or record videos in a plurality of coding formats, for example, moving picture experts group (MPEG) 1, MPEG2, MPEG3, and MPEG4.

The NPU is a neural-network (neural-network, NN) computing processor, quickly processes input information by referring to a structure of a biological neural network, for example, by referring to a transfer mode between human brain neurons, and may further continuously perform self-learning. The NPU may be used to implement intelligent cognition and other applications of the mobile terminal 100, such as image recognition, facial recognition, speech recognition, and text understanding.

The external memory interface 120 may be configured to connect to an external storage card such as a micro SD card, to extend a storage capability of the mobile terminal 100. The external memory card communicates with the processor 110 through the external memory interface 120, to implement a data storage function. For example, files such as music and a video are stored in the external memory card.

The internal memory 121 may be configured to store computer executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) created during use of the mobile terminal 100, and the like. In addition, the internal memory 121 may include a high-speed random access memory, or may include a nonvolatile memory, for example, at least one magnetic disk storage device, a flash storage device, or a universal flash storage (UFS). The processor 110 runs the instructions stored in the internal memory 121 and/or instructions stored in the memory disposed in the processor, to perform various functional applications of the mobile terminal 100 and data processing.

The mobile terminal 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The mobile terminal 100 may be used to listen to music or answer a call in a hands-free mode over the speaker 170A.

The receiver 170B, also referred to as an "earpiece", is configured to convert an electrical audio signal into a sound signal. When a call is answered or audio information is listened to by using the mobile terminal 100, the receiver 170B may be put close to a human ear to listen to a voice.

The microphone 170C, also referred to as a "mike" or a "microphone", is configured to convert a sound signal into an electrical signal. When making a call or sending speech information, a user may make a sound by moving a human mouth close to the microphone 170C to input a sound signal to the microphone 170C. At least one microphone 170C may be disposed in the mobile terminal 100. In some other embodiments, two microphones 170C may be disposed in the mobile terminal 100, to collect a sound signal and implement a noise reduction function. In some other embodiments, three, four, or more microphones 170C may alternatively be disposed in the mobile terminal 100, to collect a sound signal, reduce noise, identify a sound source, implement a directional recording function, and the like.

The headset jack 170D is configured to connect to a wired headset. The headset jack 170D may be a USB interface 130, a 3.5 mm open mobile terminal platform (OMTP) standard interface, or a cellular telecommunications industry association of the USA (CTIA) standard interface.

The key 190 includes a power key, a volume key, and the like. The key 190 may be a mechanical key, or may be a touch key. The mobile terminal 100 may receive a key input, and generate a key signal input related to a user setting and function control of the mobile terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the mobile terminal 100. The mobile terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external memory card. The mobile terminal 100 interacts with a network through the SIM card, to implement functions such as calling and data communication. In some embodiments, the mobile terminal 100 uses an eSIM, namely, an embedded SIM card. The eSIM card may be embedded in the mobile terminal 100, and cannot be separated from the mobile terminal 100.

A software system of the mobile terminal 100 may use a layered architecture, an event-driven architecture, a microkernel architecture, a microservice architecture, or a cloud architecture. In the embodiments of the present invention, an Android system using a layered architecture is used as an example to illustrate a software structure of the mobile terminal 100.

Figure 3:
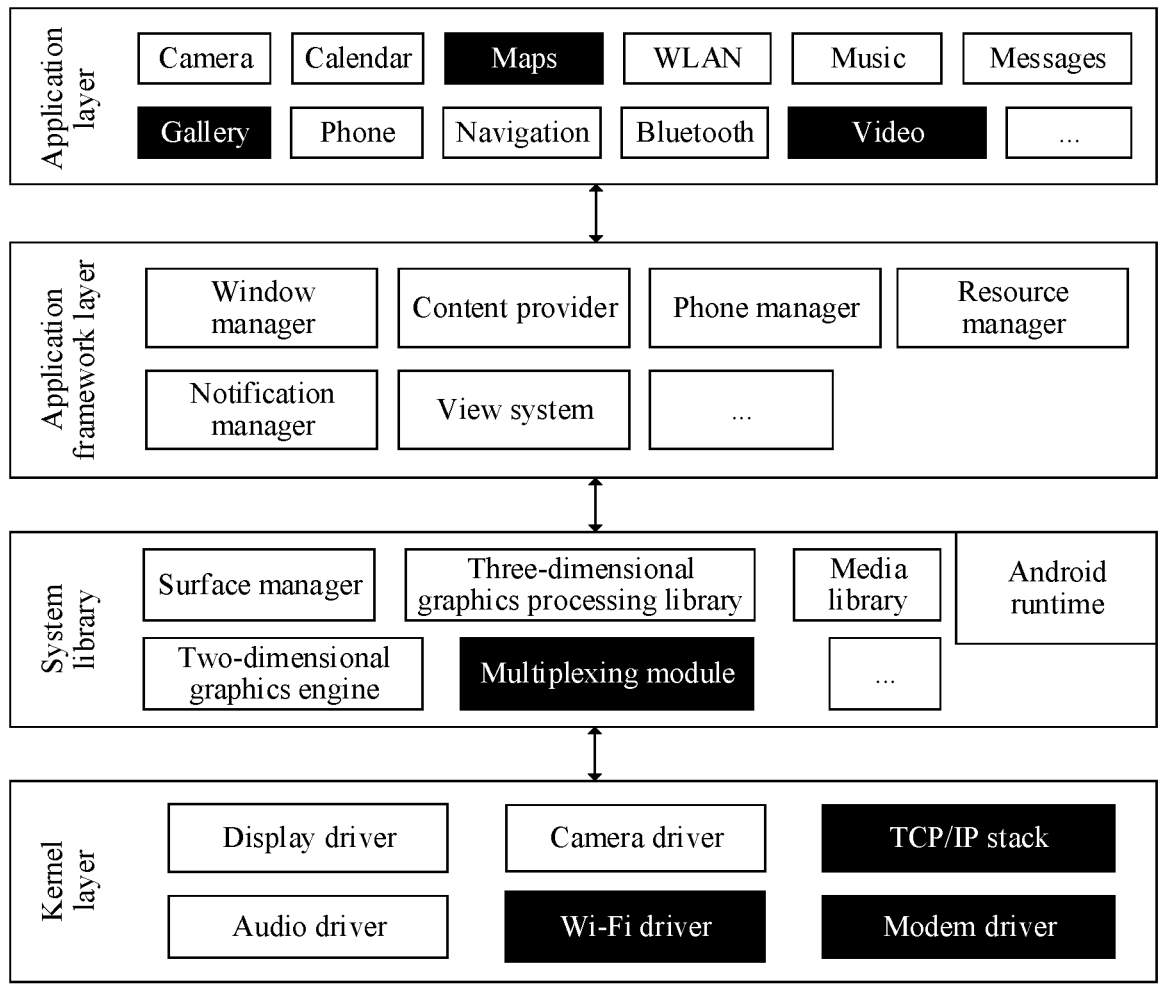
FIG. 3 is a schematic structural diagram 2 of a mobile terminal according to an embodiment of this application.

FIG. 3 is a block diagram of a software structure of the mobile terminal 100 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Video, and Messages.

In some embodiments of this application, some applications need to request relatively heavy traffic from a server during running. For example, a video application requests heavy traffic when playing a high-definition video or an ultra-high-definition video. For another example, a map application also requests heavy traffic when updating three-dimensional map data. For still another example, when a user plays a game, a game application requests heavy traffic. When these applications request heavy data traffic, multiplexing of HTTP channels provided in the embodiments of this application can increase a bandwidth during data transmission, improve data transmission efficiency, and achieve an experience in which a download speed is faster, less frame freezing occurs, and video playing is smoother when the user watches a video.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to construct an application. A display interface may include one or more views.

For example, a display interface including a Messages notification icon may include a text display view and a picture display view:

The phone manager is configured to provide a communication function of the mobile terminal 100, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an announcement is produced, the mobile terminal vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

In some embodiments of this application, the system library may further include a multiplexing module. When an application at the application layer sends an HTTP request for requesting data, the multiplexing module may be invoked to implement heavy-traffic data transmission through a plurality of HTTP channels, to improve transmission efficiency of heavy-traffic data. For example, when the HTTP request (which may be referred to as an original HTTP request) sent by the application at the application layer is received, the multiplexing module can make a copy of the original HTTP request. Then, when receiving an HTTP response returned by the server, the multiplexing module obtains a content-length field carried in the response. The multiplexing module generates a request of another HTTP channel based on the copied HTTP request and the content-length field, to request to simultaneously transmit a part of the requested data in the original HTTP request on the another HTTP channel. In this way, heavy-traffic data transmission through the plurality of HTTP channels is implemented, to improve the transmission efficiency.

In some other embodiments of this application, a multiplexing module may alternatively be located in each application module at the application layer. To be specific, the multiplexing module in each application module may be configured to implement multiplexing of HTTP channels when the application requests data, to improve data transmission efficiency of the application. This is not limited in the embodiments of this application.

The surface manager is configured to manage a display subsystem and provide fusion of 2D and 3D layers for a plurality of applications.

The media library supports play back and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In some embodiments of this application, the kernel layer further includes a TCP/IP protocol stack that is configured to encapsulate a message generated by an upper-layer application, to generate a message that complies with a related inter-network communications protocol, so as to transmit the message to a corresponding server through a network. Correspondingly, the TCP/IP protocol stack is also configured to parse a message that is received from the network and sent by the server, to generate a message that can be parsed by the upper-layer application, send the message to an upload application for further processing, and the like.

The kernel layer further includes a Wi-Fi driver and a modem driver. The Wi-Fi driver may be configured to establish and disconnect a Wi-Fi link between the mobile terminal 100 and an electronic device 200 or between the mobile terminal 100 and an electronic device 400, and transmit a message by using the Wi-Fi link. The modem driver may be configured to establish and disconnect a mobile communications link between the mobile terminal 100 and a base station 300, and transmit a message by using the mobile communications link.

All technical solutions in the following embodiments may be implemented in the mobile terminal 100 having the hardware architecture shown in FIG. 2 and the software architecture shown in FIG. 3.

The following describes in detail the technical solutions provided in the embodiments of this application with reference to the accompanying drawings.

Figure 4:
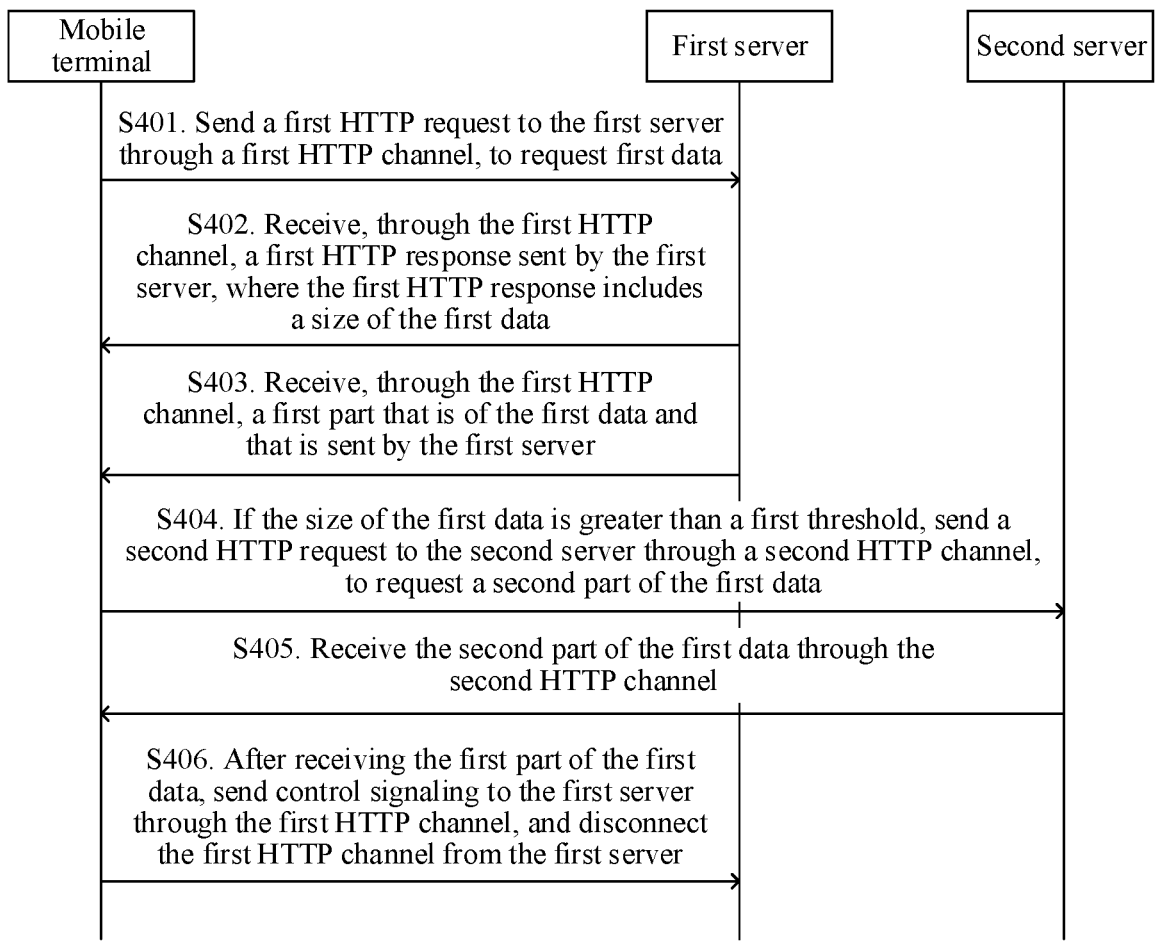
FIG. 4 is a schematic flowchart of a method for multiplexing HTTP channels according to an embodiment of this application.

FIG. 4 is a schematic flowchart of a method for multiplexing HTTP channels according to an embodiment of this application. Details are as follows.

S401. A mobile terminal sends a first HTTP request to a first server through a first HTTP channel, to request first data.

For example, an application is installed on the mobile terminal, and a user may instruct, by operating the application, the mobile terminal to request data from the first server corresponding to the application. With reference to the structure shown in FIG. 3, an example in which the user operates a video application is used for description. For example, after receiving an operation performed by the user on a player control corresponding to a related video in the video application, the mobile terminal generates the first HTTP request to request to obtain, from the first server corresponding to the video application, the first data corresponding to the video. The video application may perform communication by using protocols such as HTTP1/1.1/

HTTP2. In a specific implementation, the video application of the mobile terminal sends the first HTTP request to the first server through the multiplexing module at the framework layer and the TCP/IP protocol stack at the kernel layer by using the modem driver or the Wi-Fi driver.

It can be learned from an HTTP protocol that the first HTTP request carries a uniform resource identifier (URI) or a uniform resource locator (URL), which is used to indicate an address, in a network, of the first data requested by the mobile terminal. Before sending the first HTTP request, the mobile terminal may send a domain name system (DNS) request (for example, a standard DNS request or an HTTP DNS request) through the first HTTP channel, to obtain, through parsing, a network address (an IP address) of the first server that stores the first data. Then, the mobile terminal sends the first HTTP request through the first HTTP channel, to request the first data from the first server. In some examples, the first HTTP request does not carry a range of the requested first data. For example, the first HTTP request does not carry a range byte (range byte, or range bytes, or range: bytes) field of the first data. In this case, the first HTTP request cannot be split into a plurality of HTTP requests based on a byte range of the first data in the conventional technology, to implement the multiplexing of HTTP channels. However, the method provided in the embodiments of this application may implement the multiplexing of HTTP channels. For details, refer to the following description.

In some embodiments of this application, the mobile terminal may store a first HTTP request, so that the mobile terminal can directly use values of some fields, such as the URI or URL, in the first HTTP request when subsequently generating an HTTP request of another HTTP channel based on the first HTTP request.

In some other embodiments of this application, as described above, the mobile terminal may establish at least two HTTP channels. The mobile terminal may select one channel (for example, a channel with smallest estimated flow completion time (FCT)) from the at least two HTTP channels as the first HTTP channel, to transmit the first HTTP request. This is because the mobile terminal first transmits the first HTTP request, receives a first HTTP response, and receives a part of content in the first data through the first HTTP channel. Then, after receiving the first HTTP response, the mobile terminal requests, based on a length of the first data in the first HTTP response, another HTTP channel to start transmitting another part of content in the first data. Therefore, selecting the channel with the smallest estimated FCT to first transmit a part of data of the first data helps reduce time consumed for transmitting the first data and improve transmission efficiency of the first data.

The estimated FCT may include time consumed for establishing a connection on the first HTTP channel, time consumed for transmitting unit-size data on the first HTTP channel, a data transmission delay, and the like. It can be learned that the estimated FCT may reflect a data transmission rate and data transmission efficiency of an HTTP channel. For a specific FCT calculation method, refer to a related algorithm in the art. This is not limited in the embodiments of this application.

Optionally, the mobile terminal may alternatively select, based on another principle, one of the at least two HTTP channels as the first HTTP channel. For example, a preset HTTP channel is selected as the first HTTP channel, for example, a Wi-Fi channel is preferably selected. For another example, an HTTP channel on which a connection is established is selected as the first HTTP channel. The HTTP channel on which the connection is established can reduce time consumed for establishing the connection, and therefore helps improve transmission efficiency of the first data.

S402. The mobile terminal receives, through the first HTTP channel, the first HTTP response sent by the first server, where the first HTTP response includes a size of the first data.

It can be learned from the HTTP protocol that the first HTTP response carries a length of to-be-returned data, namely, the size of the first data, for example, a value of a content length field in the first HTTP response.

S403. After receiving the first HTTP response, the mobile terminal receives, through the first HTTP channel, a first part that is of the first data and that is sent by the first server.

After receiving the first HTTP response, the mobile terminal may start to receive the first data sent by the first server through the first HTTP channel. It should be noted that, in the embodiments of this application, another HTTP channel may be subsequently invoked to jointly transmit the first data. Therefore, a part that is of the first data and that is transmitted through the first HTTP channel is denoted as the first part of the first data. In addition, the mobile terminal may obtain the size of the first data based on the received first HTTP response, and determine, based on the size of the first data, whether the first data needs to be jointly transmitted through a plurality of HTTP channels.

For example, still referring to the structure shown in FIG. 3, after receiving the first HTTP response through a Wi-Fi link or a cellular network link, the mobile terminal may upload the first HTTP response to the multiplexing module. The multiplexing module determines whether the first data needs to be transmitted through a plurality of channels. In addition, the multiplexing module uploads the first part that is of the first data and that is received through the first HTTP channel to a corresponding upper-layer application, for example, a video application.

It should be further noted that, in some examples, the first HTTP response may carry a part of the first data. In this case, in the following, a size of first data used when whether to jointly transmit the first data through a second HTTP channel is determined based on the size of the first data, and when a second part of the first data is allocated through the second HTTP channel needs to be obtained through subtracting a size of the part that is of the first data and that is carried in the first HTTP response from a total size of the first data. Certainly, the part that is of the first data and that is carried in the first HTTP response is usually relatively small, and a size of data of this part of may also be ignored. The following is described by using an example in which the first HTTP response does not carry the part of the first data, or the part that is of the first data and that is carried in the first HTTP response may be ignored.

S404. If the size of the first data is greater than a first threshold, the mobile terminal sends a second HTTP request to a second server through the second HTTP channel, to request the second part of the first data.

The second HTTP channel is an HTTP channel that is different from the first HTTP channel. There is at least one second HTTP channel. The second server and the first server may be a same server, or may be different servers.

If the size of the first data is less than or equal to the first threshold, it is considered that the mobile terminal only needs to transmit the first data through the first HTTP channel, and does not need to transmit the first data through the plurality of HTTP channels. If the size of the first data is greater than the first threshold, it is considered that the mobile terminal needs to transmit the first data through the plurality of HTTP channels. After it is determined that the first data needs to be transmitted through the plurality of HTTP channels, a byte range of data that is of the first data and that is transmitted through the HTTP channels. That is, a byte range of data that is of the first data and that is transmitted through the first HTTP channel (namely, a byte range of the first part) and a byte range of data that is of the first data and that is transmitted through the second HTTP channel (namely, a byte range of the second part) further need to be determined.

It should be noted that the first HTTP channel first starts to receive the first part of the first data, and then the second HTTP channel starts to receive the second part of the first data. That is, when using the first data, an application usually first uses the first part of the first data, and then uses the second part of the first data. That is, the byte range of the first part usually starts from a first byte of the first data. The byte range of the second part usually starts from a middle byte of the first data. For example, if the first data is transmitted in a multiplexing mode through two HTTP channels, the byte range of the second part starts from the middle byte to a last byte of the first data.

For example, the first data is video data that is requested by the video application, and the first part of the first data may include video data in an earlier part in time, for example, video data from the $0^{th}$ minute to the $30^{th}$ minute. The second data may be video data in a later part in time, for example, video data from the $31^{st}$ minute to the $45^{th}$ minute. In this case, when using the first data, the video application needs to first use the first part of the first data, and then use the second part of the first data.

A method for determining the first threshold and determining the byte range of the first part and the byte range of the second part of the first data is described in detail below; and is not described herein.

Then, the mobile terminal may generate the second HTTP request based on the stored first HTTP request and the determined byte range of the transmitted second part, to request the first server to transmit the second part of the first data through the second HTTP channel. In a specific implementation, the mobile terminal may add a range byte field to the stored first HTTP request or modify a range byte field in the stored first HTTP request, write the byte range corresponding to the second part of the first data, and modify a value of a host field in the stored first HTTP request from an address of the first server to an address of the second server, or the like, to obtain the second HTTP request. Then, the mobile terminal sends the second HTTP request through the second HTTP channel, to request the second server to return the second part of the first data through the second HTTP channel.

In some other embodiments, before sending the second HTTP request to the second server through the second HTTP channel, the mobile terminal may send a DNS request through the second HTTP channel based on the URI or the URL in the stored first HTTP request, to obtain an IP address of the second server through parsing. For example, when sending a DNS request (requesting an IP address of the first server) through the first HTTP channel, the mobile terminal may send the DNS request in advance through the second HTTP channel, to request the IP address of the second server. For another example, when determining that the size of the first data is greater than the first threshold, and determining that the first data needs to be sent through the second HTTP channel, the mobile terminal may send the DNS request through the second HTTP channel, to request the IP address of the second server. This is not limited in the embodiments of this application.

In some examples, after determining that the first data is greater than the first threshold, the mobile terminal may start to establish a connection on the second HTTP channel, transmit the second HTTP request through the second HTTP channel, and receive the second part of the first data through the second HTTP channel. In this way, the connection on the second HTTP channel is established only when the second HTTP channel is required for data transmission, and this helps save resources of the mobile terminal. In some other examples, the mobile terminal may establish a connection on the second HTTP channel in advance when receiving the first HTTP request. After determining that the first data is greater than the first threshold, the mobile terminal may directly transmit the second HTTP request through the second HTTP channel. In this way, time consumed for establishing the connection on the second HTTP channel is reduced, and a transmission rate of the first data is accelerated.

S405. The mobile terminal receives, through the second HTTP channel, the second part that is of the first data and that is returned by the second server.

In this way, the first data is simultaneously transmitted through the first HTTP channel and the second HTTP channel, and this increases a bandwidth for transmitting the first data, and accelerates a download rate of the first data.

In some embodiments, when the first server transmits the first part of the first data through the first HTTP channel, and when the second server transmits the second part of the first data through the second HTTP channel, a chunk transmission method may be used. That is, the first server further divides the first part of the first data into a plurality of chunks, and transmits the chunks to the mobile terminal in batches through the first HTTP channel. Similarly, the second server may also divide the second part of the second data into a plurality of chunks, and transmit the chunks to the mobile terminal in batches through the second HTTP channel. Because the first data is simultaneously transmitted through the first HTTP channel and the second HTTP channel, the mobile terminal may receive a chunk of the first part and a chunk of the second part alternately. In this case, the mobile terminal first uses the chunk of the first part, and then uses the chunk of the second part.

For example, still referring to the structure shown in FIG. 3, after receiving a chunk of the first data through a Wi-Fi link or a cellular network link, the mobile terminal may determine whether the received chunk of the first data is a chunk of the first part or a chunk of the second part. If the chunk is the chunk of the first part, the multiplexing module sends the chunk to an application that requests the first data. If the chunk is the chunk of the second part, the multiplexing module buffers the chunk. After it is determined that all the chunks of the first part are sent to the application that requests the first data, the chunks of the second part are sent to the application that requests the first data.

In a process in which the multiplexing module sends the received chunks of the first data to the application that requests the first data, the first chunk that is sent to the application carries a header of the first HTTP response. Subsequently, another chunk that is of the first data and that is sent to the application may not carry the header of the first HTTP response.

S406. After receiving the first part of the first data, the mobile terminal sends control signaling to the first server through the first HTTP channel, and disconnects the first HTTP channel from the first server.

For example, after determining that the first part of the first data is received, the mobile terminal needs to send the control signaling, for example, an HTTP reset packet or a TCP reset packet, to the first server through the first HTTP channel, to disconnect the first HTTP channel from the first server. This is because the first server returns the first data to the mobile terminal based on the first HTTP request sent by the mobile terminal. Because the first HTTP request does not carry a range byte field, the first server returns all the first data to the mobile terminal according to a protocol. However, in the embodiments of this application, the second part of the first data is returned by the first server to the mobile terminal through the second HTTP channel based on the second HTTP request. Therefore, after determining that the first part of the first data is received, the mobile terminal needs to disconnect the first HTTP channel from the first server, and does not receive the second part of the first data through the first HTTP channel.

Optionally, if the mobile terminal sends the TCP reset packet to the first server through the first HTTP channel, the mobile terminal releases a TCP connection to the first HTTP channel. Then, the mobile terminal may also restart and establish the connection between the HTTP channel of the first server and the mobile terminal, so that the mobile terminal continues to transmit another HTTP request and corresponding data through the connection of the first HTTP channel.

It should be noted that the mobile terminal requests the second part of the first data from the second server by using the second HTTP request on the second HTTP channel. Because the second HTTP request carries the byte range of the requested second part, the second server returns only the second part of the first data to the mobile terminal.

An example in which two HTTP channels are multiplexed, and the connection on the second HTTP channel is established only after it is determined that the first data is greater than the first threshold is used to describe the first threshold and the method for determining the byte range of the first part and the byte range of the second part in the embodiments of this application.

Method 1: Data transmission on the first HTTP channel and the second HTTP channel is simultaneously completed.

Step 1: Set the first threshold.

The first threshold may be determined based on the size of the first data, a bandwidth and round-trip time (RTT) of the first HTTP channel, and a bandwidth and round trip time of the second HTTP channel.

For example, it is assumed that the first data is transmitted through only the first HTTP channel (for example, a Wi-Fi channel), and estimated FCT 1 is calculated:

$$FCT1 = V1/BDW(A), \text{ where} \qquad \text{(formula 1)}$$

V1 is the size of the first data, and BDW(A) is the bandwidth of the first HTTP channel.

It is assumed that the first data is transmitted through two channels. For example, one channel is a Wi-Fi channel, and the other channel is a cellular network channel, for example, LTE. Estimated FCT 2 is calculated:

$$FCT2 = 2RTT(B) + V2/(c \times SUM(BDW)), \text{ and} \qquad \text{(formula 2)}$$

$$V2 = V1 - 2RTT(B) \times BDW(A), \text{ where} \qquad \text{(formula 3)}$$

SUM(BDW)=BDW(A)+BDW(B), and BDW(B) is the bandwidth of the second HTTP channel. RTT(B) is the round-trip time of the second HTTP channel. C is a loss ratio, for example, C can be 0.75. V2 is a size of data jointly transmitted through the two HTTP channels after the connection on the second HTTP channel is established.

It should be noted that the mobile terminal first establishes the connection on the first HTTP channel, and then establishes the connection on the second HTTP channel. In other words, when the mobile terminal establishes the connection on the second HTTP channel, the first HTTP channel already starts to transmit the first data. In other words, when the connection on the second HTTP channel is established, the size of data transmitted through the first HTTP channel is 2RTT(B)×BDW(A).

In addition, to achieve highest transmission efficiency of the first data through the first HTTP channel and the second HTTP channel, it may be assumed that transmission of corresponding data on the first HTTP channel and the second HTTP channel is simultaneously completed. That is, time consumed for completing transmission of data with a size of V2 through the first HTTP channel and the second HTTP channel is V2/(c×SUM(BDW)).

With reference to formula 1, formula 2, and formula 3, if FCT 1=FCT 2, a value of V1, namely, the first threshold, may be calculated.

For example, assuming that RTT(A)=RTT(B)=70 ms, BDW(A)=24 Mbps, and BDW(B)=24 Mbps, it may be calculated that the first threshold is 1.6 MB. To be specific, in this example, if a size of a to-be-transmitted first data is greater than 1.6 MB, the first data is transmitted through two HTTP channels. If a size of a to-be-transmitted first data is less than or equal to 1.6 MB, the first data is not transmitted through two HTTP channels. It should be further noted that an example in which the connection on the first HTTP channel is first established, and the second HTTP channel is established only after it is determined that the size of the first data is greater than the first threshold is used to describe a method for determining the first threshold. If the connection of the second HTTP channel is established in advance before it is determined that the size of the first data is greater than the first threshold, formula 2 becomes formula 2A, and formula 2A is as follows:

$$FCT2 = V1/(c \times SUM(BDW)). \qquad \text{(formula 2A)}$$

With reference to formula 1 and formula 2A, if FCT 1=FCT 2, a value of V1, namely, a first threshold in the method for establishing the connection of the second HTTP channel in advance, may be calculated.

Step 2: Determine a byte range of data transmitted through each HTTP channel.

Assuming that the size of the first data is V1, a size of a first part of data that needs to be transmitted through the first HTTP channel is V(A), and a size of a second part of the data that needs to be transmitted through the second HTTP channel is V(B), $$V1 = (A) + V(B). \qquad \text{(formula 4)}$$

Time FCT(A) required for completing transmission of data with a size of V(A) through the first HTTP channel is estimated as:

$$FCT(A) = V(A)/BDW(A). \qquad \text{(formula 5)}$$

Time FCT(B) required for completing transmission of data with a size of V(B) through the second HTTP channel is estimated as:

$$FCT(B) = V(B)/BDW(B). \qquad \text{(formula 6)}$$

It can be learned from the foregoing analysis that the first HTTP channel starts to transmit the first data when the connection of the second HTTP channel is established, and ends data transmission at the same time as the second HTTP channel. Therefore, the FCT(A) and the FCT(B) have the following relationship:

$$FCT(A)=FCT(B)+2RTT(B). \quad \text{(formula 7)}$$

V(A) and V(B) may be calculated with reference to the foregoing formula 4 to formula 7.

Therefore, it may be determined that the byte range of the first part that is of the first data and that needs to be transmitted through the first HTTP channel is a byte 0 to a byte V(A), and the byte range of the second part that is of the first data and that needs to be transmitted through the second HTTP channel is a byte {V(A)+1} to a byte V1. Alternatively, it is determined that the byte range of the first part that is of the first data and that needs to be transmitted through the first HTTP channel is a byte 0 to a byte {V(A)−1}, and the byte range of the second part that is of the first data and that needs to be transmitted through the second HTTP channel is a byte V(A) to a byte V1.

In this technical solution, transmission efficiency is highest when it is estimated that two HTTP channels simultaneously complete transmission of corresponding data.

It should be further noted that an example in which the connection on the first HTTP channel is first established, and the second HTTP channel is established only after it is determined that the size of the first data is greater than the first threshold is used to describe a method for determining the first threshold. If the connection on the second HTTP channel is established in advance before it is determined that the size of the first data is greater than the first threshold, with reference to formula 4 and formula 6, if FCT(A)=FCT(B), V(A) and V(B) may be calculated.

In some other examples, if the mobile terminal can support multiplexing of more than two HTTP channels, the mobile terminal may further determine whether V(A) and V(B) are greater than the first threshold. If any one of V(A) and V(B) is greater than the first threshold, division may be further performed by using a similar method, so that the first data is jointly transmitted through more than two HTTP channels, to increase a transmission bandwidth of the first data, and improve transmission efficiency of the first data. Certainly, a method similar to the method 1 may also be used to directly determine, in a scenario in which the first data is jointly transmitted through more than two HTTP channels (for example, three HTTP channels), a value of the first threshold, and a size of data that needs to be transmitted through each of the more than two HTTP channels. This is not limited in the embodiments of this application.

Method 2: The first HTTP channel and the second HTTP channel may not complete transmission simultaneously.

Step 1: Determine a first threshold.

If time for transmitting the first data through only the first HTTP channel is greater than time for establishing the connection on the second HTTP channel, it may be determined that the first data is transmitted through two HTTP channels.

Assuming that the first data is transmitted through only the first HTTP channel, estimated FCT 1 is calculated:

$$FCT1=V1/BDW(A). \quad \text{(formula 4)}$$

The time for establishing the connection of the second HTTP channel is T(B)=1.5RTT(B)+RTT(B) (formula 5).

If FCT 1≥T(B), with reference to formula 4 and formula 5, a minimum value of V1, namely, the first threshold, may be calculated.

Step 2: Determine a byte range of data transmitted through each HTTP channel.

When the byte range of data transmitted through each HTTP channel is to be determined, the following factors are considered:

Factor 1: It is estimated that the first HTTP channel completes transmission of the first part of the first data no later than the second HTTP channel.

In the embodiments of this application, the first part of the first data is transmitted through the first HTTP channel first, and the first part is usually a part of data with front bytes in the first data. That is, the mobile terminal usually first uses the first part of the first data, and then uses the second part of the first data. Therefore, when the byte range of data transmitted through each HTTP channel is to be set, it needs to be considered that the first HTTP channel can complete transmission of the first part of the first data no later than the second HTTP channel.

Factor 2: It is estimated that time for jointly transmitting the first data through a plurality of HTTP channels is less than time for transmitting the first data through any one of the plurality of HTTP channels.

Transmission rates of different HTTP channels are different, improper allocation of byte ranges may cause total time for jointly transmitting the first data through the plurality of HTTP channels being greater than time for transmitting the first data through an HTTP channel with a maximum transmission rate alone. Therefore, when the byte range of data transmitted through each HTTP channel is to be set, a transmission rate of each HTTP channel needs to be considered, so that time for jointly transmitting the first data through the plurality of HTTP channels is less than time for transmitting the first data through any one of the plurality of HTTP channels.

In some other examples, similar to the method 1, if the mobile terminal can support multiplexing of more than two HTTP channels, the mobile terminal may further separately determine whether sizes of data allocated to two HTTP channels are greater than the first threshold. If any one of the sizes of the data is greater than the first threshold, division may be further performed by using a method similar to the method 2, so that the first data is jointly transmitted through the more than two HTTP channels, to increase a transmission bandwidth of the first data, and improve transmission efficiency of the first data. Certainly, a method similar to method 2 may also be used to directly determine, in a scenario in which the first data is jointly transmitted through the more than two HTTP channels (for example, three HTTP channels), a value of the first threshold, and a size of data that needs to be transmitted through each of the more than two HTTP channels. This is not limited in this embodiment of this application.

It should be noted that the foregoing method 1 and method 2 are examples of two methods, provided based on inventive concept of the multiplexing provided in the embodiments of this application, for setting the first threshold and determining the byte range of data that is of the first data and that is transmitted through each HTTP channel. Certainly, a different first threshold and a different method for determining a byte range of data transmitted through each HTTP channel may alternatively be used based on an actual scenario. This is not limited in this embodiment of this application.

Referring to FIG. 5(a) to FIG. 5(d), an example in which the mobile terminal is a mobile phone is used below to describe an application scenario of the method provided in the embodiments of this application.

Figure 5A:
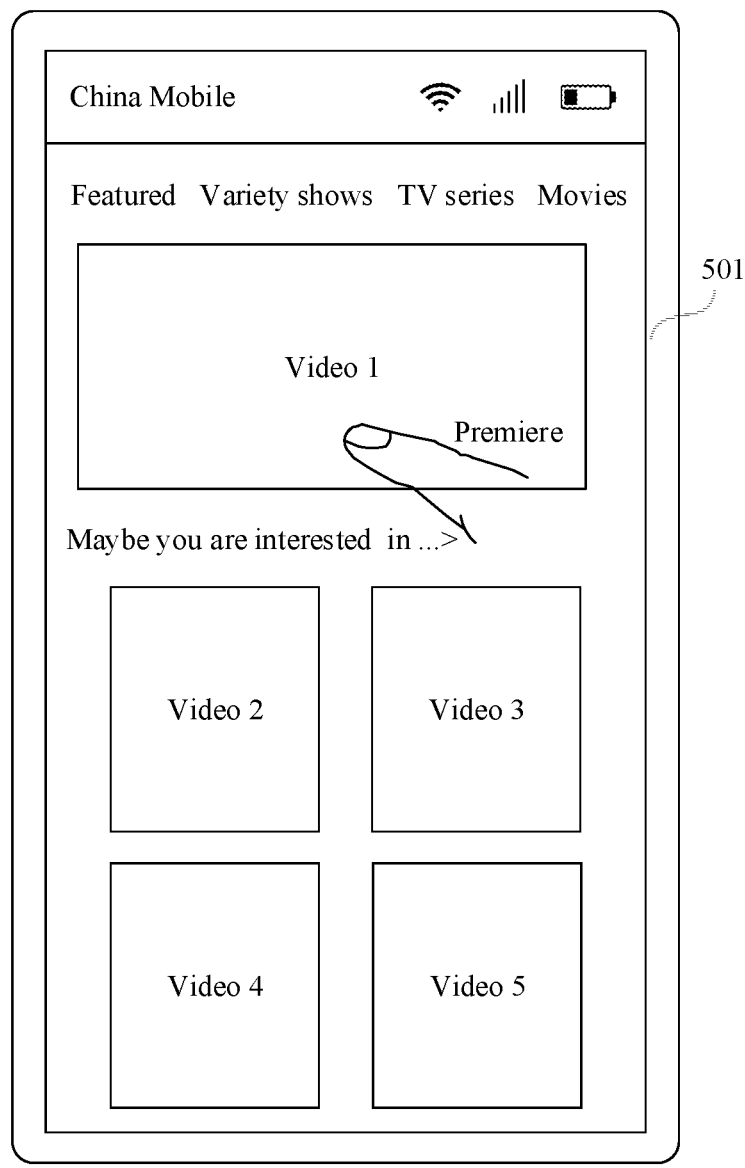
FIG. 5(a) to FIG. 5(d) are schematic diagrams of some graphical user interfaces of a mobile terminal according to an embodiment of this application.
Figure 5B:
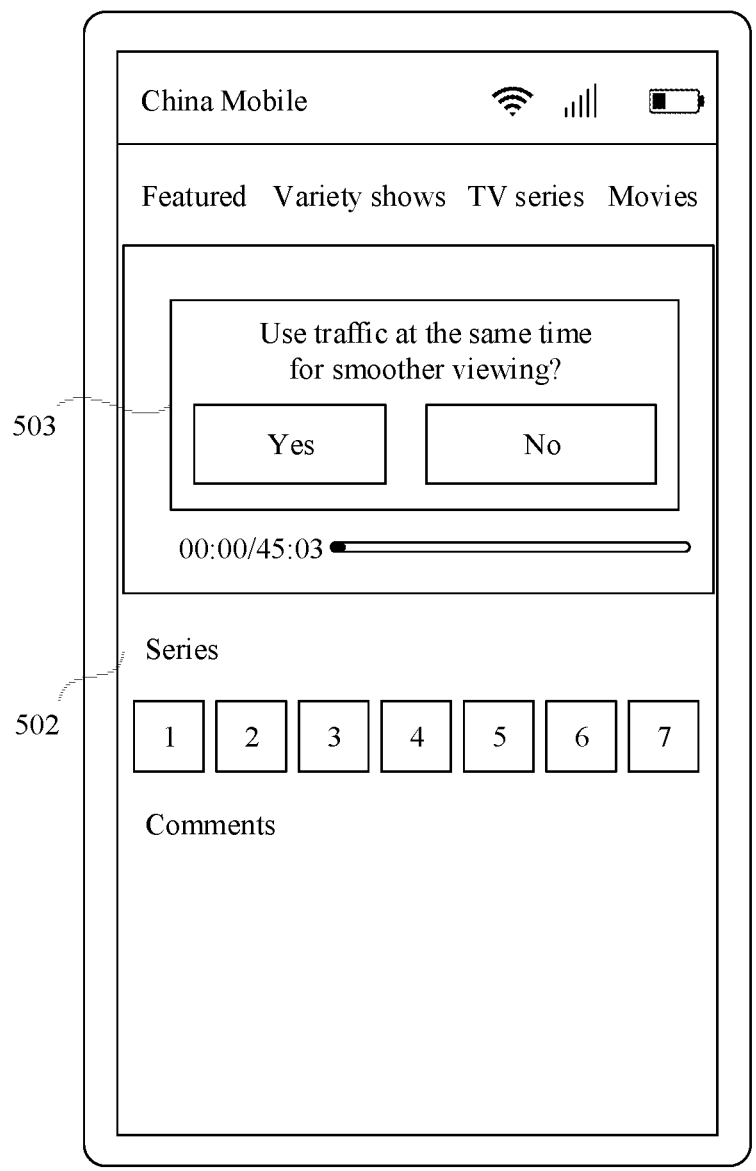

FIG. 5(a) shows a video browsing interface 501 of a video application on the mobile phone. It may be understood that the video application needs to access the internet. Therefore, at least a Wi-Fi function or a cellular network traffic function is enabled on the mobile phone before. An example in which the Wi-Fi function is enabled on the mobile phone is used for description herein. In response to detecting an operation of tapping a control corresponding to a video by a user, the video application generates a first HTTP request, and sends the first HTTP request to a server through an established Wi-Fi link, to request data (that is, first data) of the video. When receiving a first HTTP response returned by the server, the mobile phone determines whether a size that is of the data (for example, 10000 bytes) of the video and that is carried in the first HTTP response is greater than a threshold. If the size of the data is greater than the first threshold, the mobile phone determines that the first data needs to be jointly transmitted through a plurality of HTTP channels. In some examples, the mobile phone may display an interface 502 shown in FIG. 5(b). Prompt information 503 is displayed in the interface 502, and is used to ask the user whether to determine to use cellular network traffic. If the user determines to use the cellular network traffic, the mobile phone generates a second HTTP request based on the stored first HTTP request and the size that is of the requested data and that is carried in the first HTTP response. For example, a byte range that is of the request first data and that is carried in the second HTTP request is bytes 5000 to 10000. The mobile phone sends the second HTTP request to the server through a cellular network link, to request the bytes 5000 to 10000 of the first data. In other words, when receiving bytes 0 to 4999 of the first data through the Wi-Fi link, the mobile phone also receives 5000 to 10000 bytes of the first data through the cellular network link. The mobile phone plays the video based on the received first data, that is, displays a video playing interface 504 shown in FIG. 5(d).

Figure 5C:
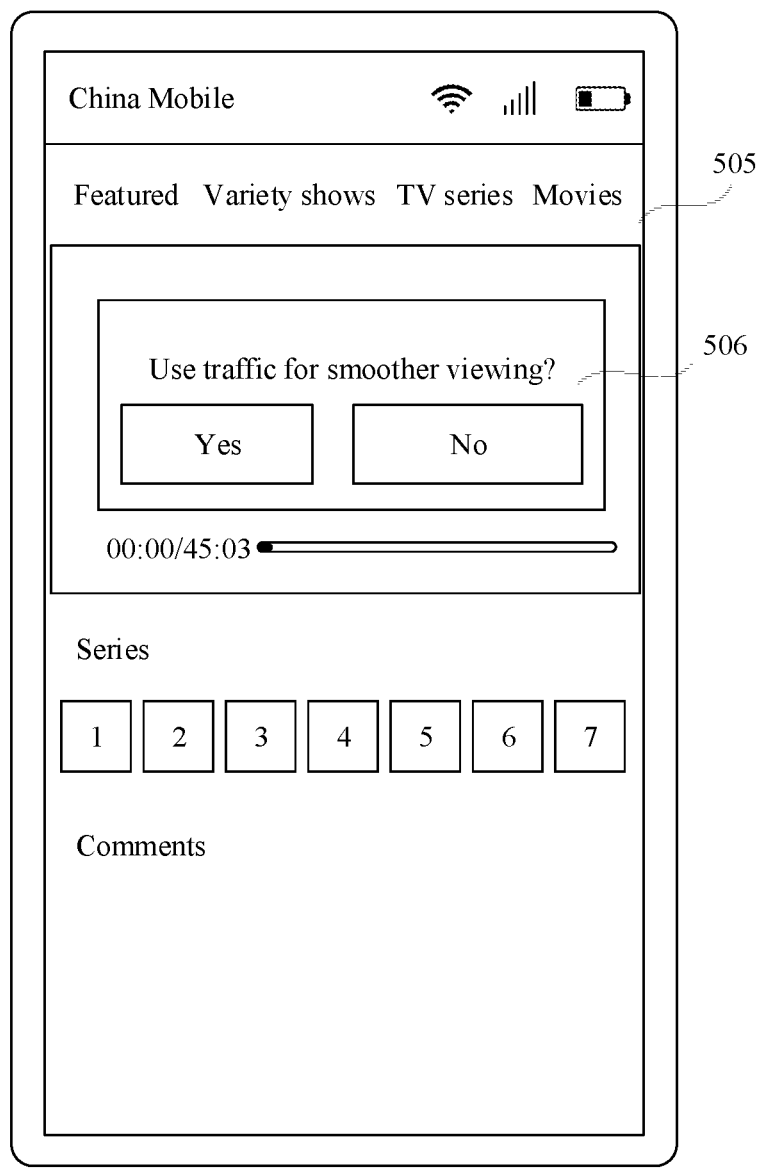
Figure 5D:
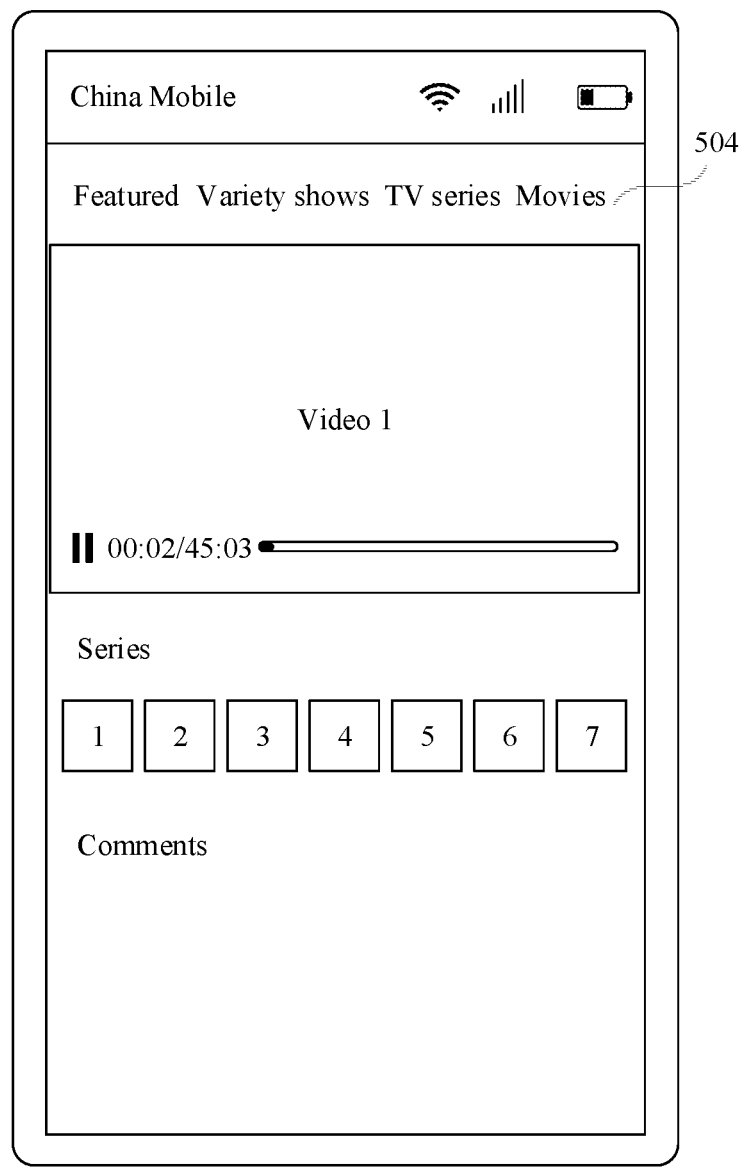

In some other examples, when the mobile phone determines that the size that is of the data of the video and that is carried in the first HTTP response is greater than the first threshold, if it is detected that the user does not enable the cellular network traffic function, for example, the mobile phone displays an interface 505 shown in FIG. 5(c). The interface 505 includes prompt information 506, and the prompt information 506 is used to prompt the user to enable the cellular network traffic function.

In the foregoing embodiment, an example in which the mobile terminal determines, by using the determined first threshold, whether to jointly transmit data through the first HTTP channel and the second HTTP channel is used for description. In still some embodiments of this application, the mobile terminal may alternatively determine, through self-learning, whether to jointly transmit data through the first HTTP channel and the second HTTP channel, and a specific amount of data transmitted through each HTTP channel.

For example, when the mobile terminal requests the first data, the mobile terminal may jointly receive the first data through the first HTTP channel and the second HTTP channel by default. In addition, a proportion (for example, a first proportion) of a size of the second part that is of the first data and that is received through the second HTTP channel to the size of the first data is set by default. Certainly, a proportion of a size of the first part that is of the first data and that is received through the first HTTP channel to the size of the first data may also be set by default. Alternatively, a proportion of a size of the first part that is of the first data and that is received through the first HTTP channel to a size of the second part that is of the first data and that is received through the second HTTP channel is set by default. The proportion that is set is not specifically limited in this application. The following uses an example in which a proportion of the size of the second part that is of the first data and that is received through the second HTTP channel to the size of the first data is set for description.

Subsequently, when the mobile terminal needs to receive second data, the mobile terminal automatically adjusts, based on time consumed for receiving the first part of the first data through the first HTTP channel and time consumed for receiving the second part of the first data through the second HTTP channel, a proportion of a size of a second part of the second data transmitted through the second HTTP channel to a size of the second data. By analogy, a proportion used to transmit other data through the first HTTP channel and the second HTTP channel may be adjusted to an appropriate proportion, to improve efficiency of data transmission through the first HTTP channel and the second HTTP channel.

For example, an example in which the mobile terminal establishes a connection between the first HTTP channel and the second HTTP channel in advance is used for description herein. If the time consumed for transmitting the first part of the first data through the first HTTP channel is longer than the time consumed for transmitting the second part of the first data through the second HTTP channel, it may be considered that transmission efficiency of the first HTTP channel is lower than that of the second HTTP channel, and the first proportion may be appropriately increased. That is, the proportion of the second part of the second data transmitted through the second HTTP channel to the second data is appropriately increased. In this way, transmission efficiency of the second data can be improved.

If the time consumed for transmitting the first part of the first data through the first HTTP channel is less than the time consumed for transmitting the second part of the first data through the second HTTP channel, it may be considered that transmission efficiency of the first HTTP channel is higher than that of the second HTTP channel, and the first proportion may be appropriately reduced. That is, the proportion of the second part of the second data transmitted through the second HTTP channel to the second data is appropriately reduced. In this way, transmission efficiency of the second data can be improved.

If the time consumed for transmitting the first part of the first data through the first HTTP channel is equal to (or approximately equal to) the time consumed for transmitting the second part of the first data through the second HTTP channel, it may be considered that transmission efficiency of the first HTTP channel is the same as that of the second HTTP channel, and the first proportion may be maintained. That is, the proportion of the second part of the second data transmitted through the second HTTP channel to the second data is maintained.

For another example, an example in which the mobile terminal may establish a connection of the second HTTP channel only when determining to use the second HTTP channel is used for description herein. If a difference obtained after the time consumed for transmitting the second part of the first data through the second HTTP channel is subtracted from the time consumed for transmitting the first part of the first data through the first HTTP channel is greater than a second threshold (for example, the second threshold includes time consumed for establishing the connection on the second HTTP channel), it may be considered that transmission efficiency of the first HTTP channel is lower than that of the second HTTP channel, and the first proportion may be properly increased. That is, the proportion of the second part of the second data transmitted through the second HTTP channel to the second data is appropriately increased. In this way, transmission efficiency of the second data can be improved.

If a difference obtained after the time consumed for transmitting the second part of the first data through the second HTTP channel is subtracted from the time consumed for transmitting the first part of the first data through the first HTTP channel is less than a second threshold, it may be considered that transmission efficiency on the first HTTP channel is higher than that on the second HTTP channel, and the first proportion may be appropriately decreased. That is, the proportion of the second part of the second data transmitted through the second HTTP channel to the second data is appropriately decreased. In this way, transmission efficiency of the second data can be improved.

If a difference obtained after the time consumed for transmitting the second part of the first data through the second HTTP channel is subtracted from the time consumed for transmitting the first part of the first data through the first HTTP channel is equal to or approximately equal to a second threshold, it may be considered that transmission efficiency on the first HTTP channel is the same as that on the second HTTP channel, and the first proportion may be maintained. That is, the proportion of the second part of the second data transmitted through the second HTTP channel to the second data is maintained. In this way, transmission efficiency of the second data can be improved.

Figure 6:
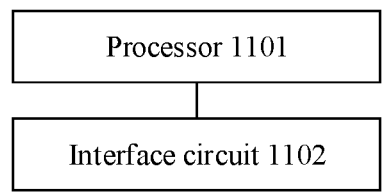
FIG. 6 is a schematic structural diagram of a chip system according to an embodiment of this application.

The embodiments of this application further provide a chip system. As shown in FIG. 6, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory of the mobile terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, the mobile terminal may perform steps performed by the mobile terminal 100 (for example, a mobile phone) in the foregoing embodiments. Certainly, the chip system may further include another discrete device. This is not specifically limited in the embodiments of this application.

It may be understood that to implement the foregoing functions, the terminal or the like includes corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal or the like may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of the present invention, module division is an example and is merely logical functional division, and may be other division in an actual implementation.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement, that is, an inner structure of an apparatus is divided into different functional modules to implement all or some of the functions described above. For a detailed working process of the foregoing systems, apparatuses, and units, refer to a corresponding process in the foregoing method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for multiplexing Hypertext Transfer Protocol (HTTP) channels, comprising:
   sending, by a mobile terminal, a first HTTP request to a first server through a first HTTP channel to request first data;
   receiving, by the mobile terminal through the first HTTP channel, a first HTTP response returned by the first server, wherein the first HTTP response carries a size of the first data;
   after receiving the first HTTP response, receiving, by the mobile terminal through the first HTTP channel, a first part that is of the first data and that is sent by the first server;

after receiving the first HTTP response, if the size of the first data is greater than a first threshold:
  generating, by the mobile terminal, a second HTTP request based on the first HTTP request and the size of the first data;
  sending the second HTTP request to a second server through a second HTTP channel, to request a second part of the first data; and
  receiving, by the mobile terminal through the second HTTP channel, the second part that is of the first data and that is returned by the second server; and
after receiving the first part of the first data, sending, by the mobile terminal, control signaling to the first server through the first HTTP channel to disconnect the first HTTP channel.

2. The method according to claim 1, wherein a content length field in the first HTTP response carries the size of the first data.

3. The method according to claim 1, further comprising:
determining, by the mobile terminal, the first threshold based on the size of the first data, a bandwidth of the first HTTP channel, a bandwidth of the second HTTP channel, and round-trip time of the second HTTP channel.

4. The method according to claim 1, further comprising:
determining, by the mobile terminal, the first threshold based on the size of the first data, a bandwidth of the first HTTP channel, and round-trip time of the second HTTP channel.

5. The method according to claim 1, further comprising:
determining, by the mobile terminal, a byte range of the second part of the first data based on the size of the first data, the bandwidth of the first HTTP channel, the bandwidth of the second HTTP channel, and the round-trip time of the second HTTP channel.

6. The method of claim 5, wherein the byte range of the second part of the first data starts from a middle byte of the first data to a last byte of the first data.

7. The method according to claim 5, further comprising:
using, by the mobile terminal, a range byte range byte field of the second HTTP request to carry the byte range of the second part of the first data.

8. The method according to claim 1, wherein the sending, by the mobile terminal, the control signaling to the first server through the first HTTP channel to disconnect the first HTTP channel is specifically:
sending, by the mobile terminal, an HTTP reset packet to the first server through the first HTTP channel.

9. The method according to claim 1, wherein the sending, by the mobile terminal, control signaling to the first server through the first HTTP channel to disconnect the first HTTP channel is specifically:
sending, by the mobile terminal, a TCP reset packet to the first server through the first HTTP channel.

10. The method according to claim 1, wherein before the sending, by the mobile terminal, the first HTTP request to the first server through the first HTTP channel the method further comprises:
determining, by the mobile terminal, that an estimated flow completion time (FCT) of the first HTTP channel is smaller than an estimated FCT of the second HTTP channel.

11. The method according to claim 1, further comprising:
before sending the first HTTP request to the first server through the first HTTP channel, sending, by the mobile terminal, a first domain name system (DNS) request based on the first HTTP request through the first HTTP channel, to request an address of the first server, and sending a second DNS request through the second HTTP channel, to request an address of the second server.

12. The method according to claim 1, further comprising:
before sending the first HTTP request to the first server through the first HTTP channel, establishing, by the mobile terminal, the first HTTP channel by using a Wi-Fi network, and establishing the second HTTP channel by using a cellular network.

13. The method according to claim 1, further comprising:
before sending the first HTTP request to the first server through the first HTTP channel, establishing, by the mobile terminal, the first HTTP channel by using a Wi-Fi network; and
before sending the second HTTP request to the second server through the second HTTP channel, establishing, by the mobile terminal, the second HTTP channel by using a cellular network.

14. The method according to claim 9, further comprising:
after sending the TCP reset packet to the first server through the first HTTP channel to disconnect the first HTTP channel, re-establishing, by the mobile terminal, the first HTTP channel.

15. A method for multiplexing Hypertext Transfer Protocol (HTTP) channels, comprising:
sending, by a mobile terminal, a first HTTP request to a first server through a first HTTP channel to request first data;
receiving, by the mobile terminal through the first HTTP channel, a first HTTP response returned by the first server, wherein the first HTTP response carries a size of the first data;
after receiving the first HTTP response, receiving, by the mobile terminal through the first HTTP channel, a first part that is of the first data and that is sent by the first server;
after receiving the first HTTP response:
  generating, by the mobile terminal, a second HTTP request based on the first HTTP request, the size of the first data, and a first proportion;
  sending the second HTTP request to a second server through a second HTTP channel, to request a second part of the first data, wherein a data size of the second part of the first data is a product of the first proportion and the size of the first data; and
  receiving, by the mobile terminal through the second HTTP channel, the second part that is of the first data and that is returned by the second server; and
after receiving the first part of the first data, sending, by the mobile terminal, first control signaling to the first server through the first HTTP channel to disconnect the first HTTP channel.

16. The method according to claim 15, further comprising:
re-establishing, by the mobile terminal, the first HTTP channel;
sending, by the mobile terminal, a third HTTP request to the first server through the first HTTP channel to request second data;
receiving, by the mobile terminal through the first HTTP channel, a second HTTP response returned by the first server, wherein the second HTTP response carries a size of the second data;

after receiving the second HTTP response, receiving, by the mobile terminal through the first HTTP channel, a first part that is of the second data and that is sent by the first server;

after receiving the second HTTP response:
- adjusting, by the mobile terminal, a value of the first proportion based on first time consumed for receiving the first part of the first data through the first HTTP channel and second time consumed for receiving the second part of the first data through the second HTTP channel;
- generating a fourth HTTP request based on the third HTTP request, the size of the second data, and an adjusted first proportion;
- sending the fourth HTTP request to the second server through the second HTTP channel, to request a second part of the second data, wherein a data size of the second part of the second data is a product of the adjusted first proportion and the size of the second data; and
- receiving, by the mobile terminal through the second HTTP channel, the second part that is of the second data and that is returned by the second server; and after receiving the first part of the second data, sending, by the mobile terminal, second control signaling to the first server through the first HTTP channel to disconnect the first HTTP channel.

17. The method according to claim 16, wherein the adjusting, by the mobile terminal, the value of the first proportion based on the first time consumed for receiving the first part of the first data through the first HTTP channel and the second time consumed for receiving the second part of the first data through the second HTTP channel is specifically:
- if a difference obtained by subtracting the second time from the first time is greater than a second threshold, increasing the first proportion: or
- if a difference obtained by subtracting the second time from the first time is less than a second threshold, decreasing the first proportion; or
- if a difference obtained by subtracting the second time from the first time is equal to a second threshold, maintaining the first proportion.

18. A mobile terminal, comprising a processor, a memory, and a touchscreen, wherein the memory and the touchscreen are coupled to the processor, the memory is configured to store computer program code, the computer program code comprises computer instructions, and when the processor reads the computer instructions from the memory, the mobile terminal is enabled to perform operations comprising:
- sending a first Hypertext Transfer Protocol (HTTP) request to a first server through a first HTTP channel to request first data;
- receiving, through the first HTTP channel, a first HTTP response returned by the first server, wherein the first HTTP response carries a size of the first data;
- after receiving the first HTTP response, receiving through the first HTTP channel, a first part that is of the first data and that is sent by the first server;
- after receiving the first HTTP response, if the size of the first data is greater than a first threshold:
  - generating a second HTTP request based on the first HTTP request and the size of the first data;
  - sending the second HTTP request to a second server through a second HTTP channel, to request a second part of the first data; and
  - receiving, by the mobile terminal through the second HTTP channel, the second part that is of the first data and that is returned by the second server; and
- after receiving the first part of the first data, sending control signaling to the first server through the first HTTP channel to disconnect the first HTTP channel.

19. The mobile terminal according to claim 18, wherein a content length field in the first HTTP response carries the size of the first data.

20. A mobile terminal, comprising a processor, a memory, and a touchscreen, wherein the memory and the touchscreen are coupled to the processor, the memory is configured to store computer program code, the computer program code comprises computer instructions, and when the processor executes the computer instructions from the memory, the mobile terminal is enabled to perform operations comprising:
- sending a first Hypertext Transfer Protocol (HTTP) request to a first server through a first HTTP channel to request first data;
- receiving, through the first HTTP channel, a first HTTP response returned by the first server, wherein the first HTTP response carries a size of the first data;
- after receiving the first HTTP response, receiving, through the first HTTP channel, a first part that is of the first data and that is sent by the first server;
- after receiving the first HTTP response:
  - generating a second HTTP request based on the first HTTP request, the size of the first data, and a first proportion;
  - sending the second HTTP request to a second server through a second HTTP channel, to request a second part of the first data, wherein a data size of the second part of the first data is a product of the first proportion and the size of the first data; and
  - receiving, by the mobile terminal through the second HTTP channel, the second part that is of the first data and that is returned by the second server; and
- after receiving the first part of the first data, sending first control signaling to the first server through the first HTTP channel to disconnect the first HTTP channel.

* * * * *

UNITED STATES PATENT AND TRADEMARK OFFICE
CERTIFICATE OF CORRECTION

PATENT NO. : 12,126,523 B2
APPLICATION NO. : 17/839154
DATED : October 22, 2024
INVENTOR(S) : Wang et al.

Page 1 of 1

It is certified that error appears in the above-identified patent and that said Letters Patent is hereby corrected as shown below:

In the Claims

Claim 17: Column 31, Line 37: "increasing the first proportion: or" should read as -- increasing the first proportion; or --.

Signed and Sealed this
Twenty-seventh Day of May, 2025

Coke Morgan Stewart
*Acting Director of the United States Patent and Trademark Office*